(12) United States Patent
Heiderscheit et al.

(10) Patent No.: US 7,779,458 B1
(45) Date of Patent: Aug. 17, 2010

(54) SITUATION AWARE MOBILE LOCATION AD HOC FIREWALL

(75) Inventors: David D. Heiderscheit, Cedar Rapids, IA (US); Raja Kambhampati, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 953 days.

(21) Appl. No.: 11/230,699

(22) Filed: Sep. 20, 2005

(51) Int. Cl.
*H04L 29/06* (2006.01)
(52) U.S. Cl. ........................................ 726/11
(58) Field of Classification Search ............ 726/11
See application file for complete search history.

(56) References Cited

U.S. PATENT DOCUMENTS

| | | | |
|---|---|---|---|
| 6,125,446 A * | 9/2000 | Olarig et al. | 726/8 |
| 6,844,966 B2 * | 1/2005 | Kho et al. | 359/402 |
| 7,092,943 B2 * | 8/2006 | Roese et al. | 707/9 |
| 7,325,248 B2 * | 1/2008 | Syvanne | 726/11 |

* cited by examiner

*Primary Examiner*—Gilberto Barron, Jr.
*Assistant Examiner*—Simon Kanaan
(74) *Attorney, Agent, or Firm*—Matthew J. Evans; Daniel M. Barbieri (57) ABSTRACT

The present invention is a wireless communication system and method. In an exemplary embodiment, the wireless communication system includes a destination system and a source network. The source network provides network services to the destination system. Further, a plurality of mobile nodes are communicatively coupled with each other for allowing data packets to be transferred between the source network and the destination system. In addition, at least one firewall is communicatively coupled with the destination system and at least one of the mobile nodes included within the plurality of mobile nodes for monitoring data packet exchange between the source network and the destination system. The at least one firewall utilizes at least location as a controlling parameter for regulating data packet exchange as the at least one mobile end node moves into areas associated with varying degrees of threat.

12 Claims, 6 Drawing Sheets

SITUATION AWARE MOBILE LOCATION AD HOC FIREWALL

FIELD OF THE INVENTION

The present invention relates generally to the field of communications and more particularly to a wireless network system including a situation aware firewall.

BACKGROUND OF THE INVENTION

The advent of the Internet and users sharing files across the Internet has spurred the need to secure both ends of the Internet connection. Without some type of security system, a computer connected to the Internet is subject to many security threats such as remote logins. Remote logins are when someone is able to connect and control in some form the connected computer. Control may range from being able to view or access the files on the computer to actually running computer programs.

Security requirements are the same regardless of whether the network is wired or wireless in which security services for authentication, access-control, confidentiality, integrity and non-repudiation should be present. However, providing security to a wireless network is much more difficult when compared to wired networks for wireless networks do not require physical access. For example, a mobile ad-hoc network (MANET) which is a self-configured network of wireless and mobile nodes communicating via radio links does not rely upon a centralized administration to operate or include any pre-defined infrastructure. Thus, each node must assume security for itself for there is no fixed infrastructure such as an authentication server to support security. A MANET without an authentication provision allows an outsider to join the wireless network and perform a variety of activities ranging from passively listening to the network traffic to actively attempting to compromise the network.

Presently, the most common method to prevent such security breaches is the use of a firewall. A firewall creates a barrier between the connected computer and the Internet. Such firewall may be in the form of software, hardware or a combination thereof. The majority of firewalls utilize the process known as packet filtering to provide protection. Since all internet communications are accomplished via the exchange of individual data packets, the firewall uses a "wall of code" to inspect both inbound and outbound individual data packets to determine whether the packet should be allowed to pass through the wall or be blocked from entry. For instance, most firewalls may be configured to prevent specific IP addresses, subnets, services, socket ports, or the like from allowing access into the network.

In addition to a firewall, an intrusion detection system is often employed to protect a wireless network. While the firewall prevents unauthorized entry, the intrusion detection system detects security violations and intrusions in the event the firewall failed to prevent the unauthorized entry from entering. For example, a typical intrusion detection system monitors activities such as packet traffic or host behavior continually, automatically recognizes inappropriate activities, and reports inappropriate activities to a system administrator upon detection.

Although the combination of a firewall and an intrusion detection system assist in creating a safe wireless network, such security mechanisms are disadvantageous under certain scenarios. Both a firewall and an intrusion detection system are generally based upon monitoring activities within the network such as packet traffic or host behavior while not considering changes in factors external to the networking environment. For example, an aircraft fighter plane equipped with all network services may move from a low threat zone into a high threat or hostile zone with the network capabilities going unchanged for the network is not sensitive to the change in location. Such situation currently requires that network capabilities be severely restricted at all times or provides for the possibility of an attack on the network occurring especially while the aircraft is present in a hostile zone.

Therefore, it would be desirable to provide a security mechanism which uses location information as a controlling parameter.

SUMMARY OF THE INVENTION

In accordance with a first aspect of the present invention, a wireless communication system is provided. In such aspect, the system includes a destination system and a source network. The source network such as the Internet provides network services to the destination system. Further, a plurality of mobile nodes are communicatively coupled with each other for allowing data packets to be transferred between the source network and the destination system. In addition, at least one firewall is communicatively coupled with the destination system and at least one of the plurality of mobile nodes for monitoring data packet exchange between the source network and the destination system. The at least one firewall utilizes at least geographical location as a controlling parameter for regulating data packet exchange as the destination system travels through zones or areas associated with varying degrees of threat.

In accordance with specific aspects of the wireless communication system, each of the plurality of mobile nodes may include a receiver, a transmitter, and a mobile node positioning system such as a global positioning system which allows each node to detect their geographical location and communicate with other nodes as well as systems. Further, an intrusion detection system may be coupled to the at least one firewall for detecting intrusion into the at least one mobile end node. In an additional aspect, the destination system may be disposed within at least one of a vehicle, aircraft, or watercraft.

In accordance with an additional aspect of the present invention, a method for establishing a wireless network which utilizes a firewall that at least employs location as a controlling parameter for regulating data packet exchange between a source network and a destination system is provided. In the present aspect, the method includes communicatively coupling a plurality of mobile nodes with each other for allowing data packets to be transferred between the source network and the destination system. Further, the method includes communicatively coupling at least one firewall with the destination system and at least one of the plurality of nodes for monitoring data packet exchange between the source network and the destination system. The at least one firewall utilizes at least location as a controlling parameter for regulating data packet exchange as the destination system moves into areas associated with varying degrees of threat.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
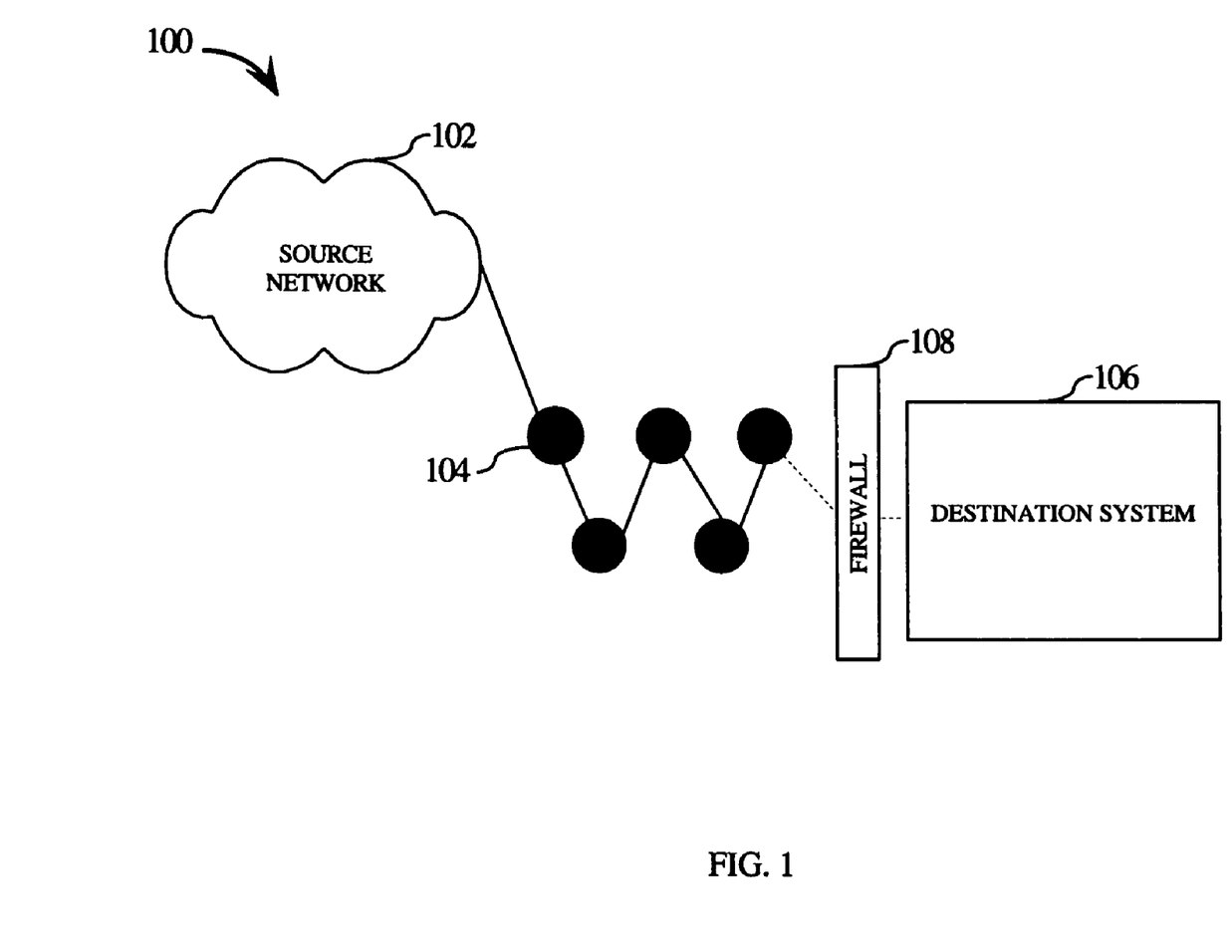
FIG. 1 is a block diagram of a wireless communication system in accordance with an exemplary embodiment of the present invention, wherein a source network communicates with a destination system via a plurality of nodes.

Referring now to FIG. 1, a wireless communication system 100 is provided. In an exemplary embodiment, the wireless communication system 100 includes a source network 102 and a destination system 106. The source network 102 such as the Internet provides network services to the destination system 106. Further, the wireless communication system 100 includes a plurality of mobile nodes 104 which are communicatively coupled with each other for allowing data packets to be transferred between the source network 102 and the destination system 106. For example, the plurality of mobile nodes 104 form a mobile ad hoc network in which the mobile nodes organize themselves in a network without the assistance of any pre-defined infrastructure or centralized administration to operate. In such network, the delivery of a data packet to a specific destination (e.g., a destination system) is based upon a hop by hop routing of the packet from node to node. In addition, at least one firewall 108 is communicatively coupled with the destination system and at least one of the plurality of mobile nodes for monitoring data packet exchange between the source network and the destination system. The at least one firewall 108 utilizes at least geographical location as a controlling parameter for regulating data packet exchange as the destination system travels through zones or areas associated with varying degrees of threat.

Figure 2:
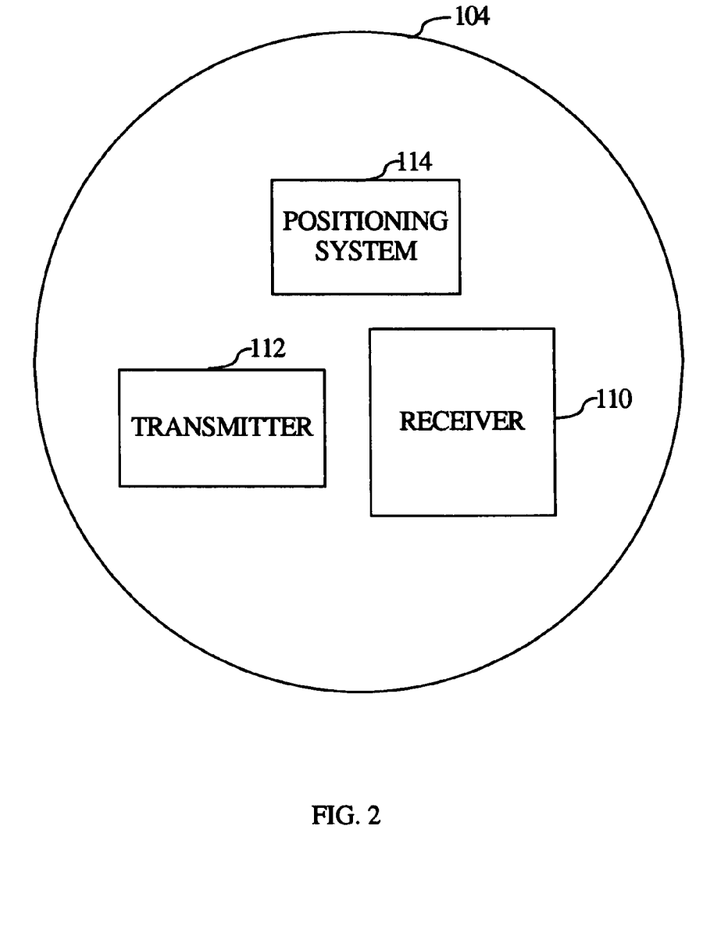
FIG. 2 is a diagram of a mobile node in accordance with an exemplary embodiment of the present invention, wherein the mobile node includes a receiver, transmitter, and positioning system.

As illustrated in FIG. 2, each mobile node 104 includes a receiver 110 for receiving a data packet from a neighboring node. Further, a transmitter 112 is included within each node for transmitting a response to a received data packet. Moreover, the transmitter 112 may transmit or broadcast its presence, position and velocity to its neighbors by transmitting a data packet such as a hello packet. For example, each node has its location information. It is contemplated that location information may include geographic co-ordinates. Such co-ordinates may be obtained by using a positioning system 114 such as a global positioning system. As illustrated in FIG. 2, in an exemplary embodiment each node includes a positioning system 114 in addition to the receiver 110 and transmitter 112. In additional exemplary embodiments, the receiver-transmitter may be included within a transceiver. Such transceiver may be capable of transmitting and receiving a data packet to neighboring nodes.

Figure 3:
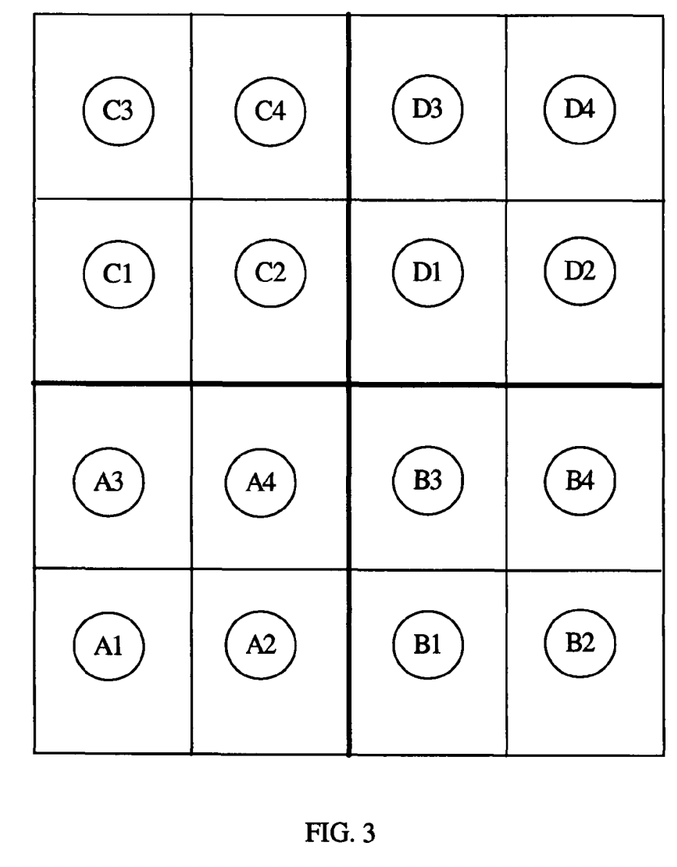
FIG. 3 is a block diagram of a plurality of mobile nodes in accordance with an exemplary embodiment of the present invention, wherein the plurality of nodes are divided into four distinct zones.

Referring to FIG. 3, an example of positioning a plurality of mobile nodes into various zones is provided. As illustrated in FIG. 3, the plurality of nodes are divided into four zones. Further, each zone includes four nodes each of which are capable of communicating with each other. A node is aware of its neighboring nodes by each node periodically broadcasting its presence, position, and velocity to its surrounding nodes. It is contemplated that the number of zones as well as the number of mobile nodes within a given zone may vary as needed.

In an exemplary embodiment, a firewall may be created to include security rules which control data packet traffic based upon the zone from which the packet originated. For example, data packets sent from zone A may include information such as a code within their IP address that indicates to the firewall their current zone location. The firewall, in turn, denies or allows entry depending upon the pre-assigned threat level associated with such zone. It is to be understood that a variety of conditions may be employed by the firewall for package recognition in addition to geographical location including, but not limited to, domain names, protocols, IP addresses, and the like.

In a further exemplary embodiment, a firewall may include or use location information to enable or disable interfaces and application services in addition to packet filtering on data exchanges. For example, the firewall may filter data packet exchanges, but also disable services possibly at the physical (device interface) as well as the application service interface in high threat zones. In such example, applications may be restricted from executing or if detected, the firewall may terminate or halt application services.

Figure 4:
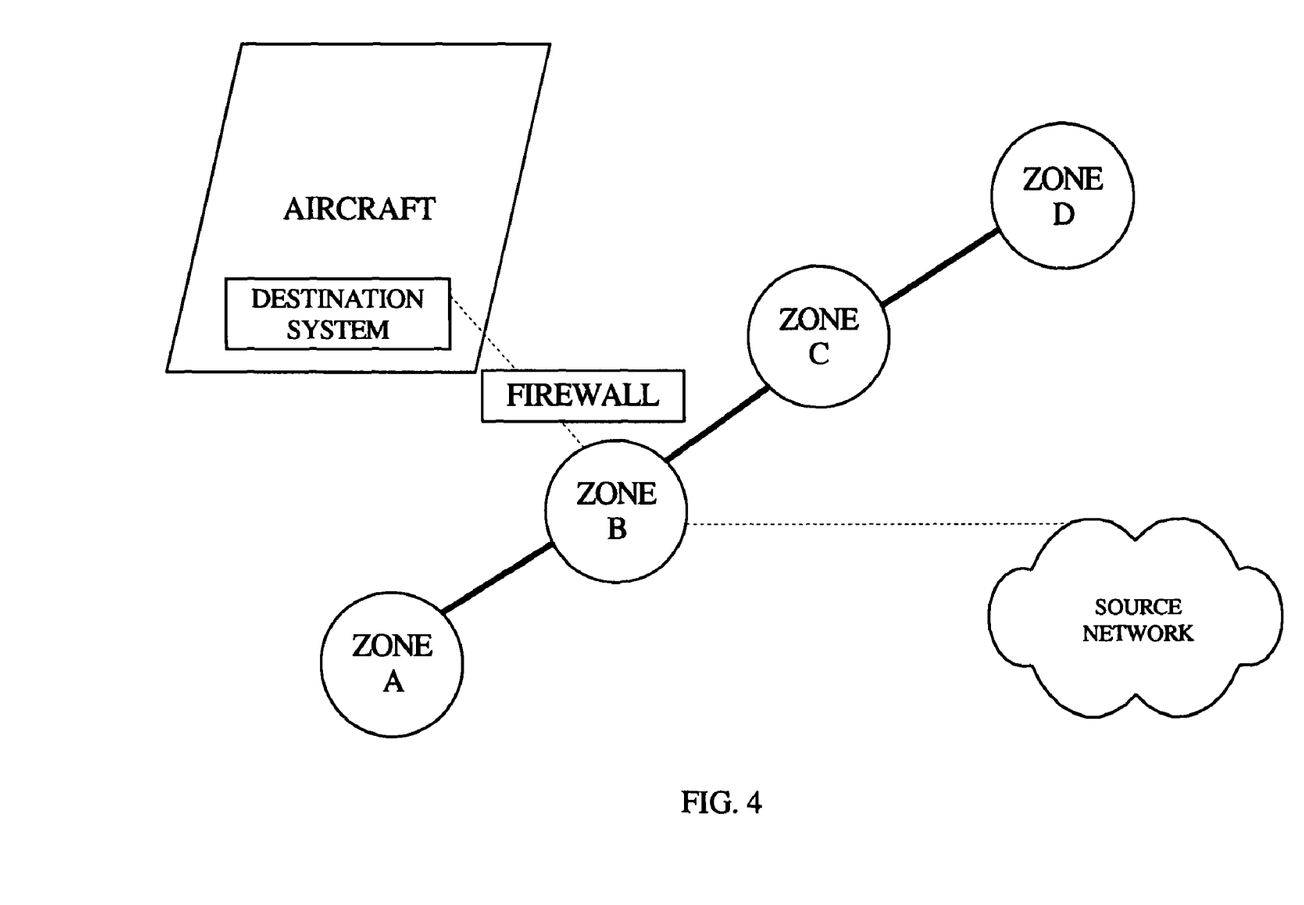
FIG. 4 is a block diagram of a wireless communication system in accordance with an exemplary embodiment of the present invention, wherein the destination system is disposed within an aircraft.

It is contemplated that the wireless communications system 100 as illustrated in FIG. 1 may be disposed within an aircraft, vehicle, vessel, and the like. The employment of the wireless communication system 100 in such entities may allow the specific entity to conduct secure transactions via the system 100 throughout the course of the mission regardless of the geographical position of the destination system. As illustrated in FIG. 4, the destination system is included within an aircraft fighter plane. As the aircraft fighter plane travels from one zone to the next, the firewall which is communicatively coupled to the destination system adjusts to its present geographical location and filters data accordingly. For example, an aircraft fighter plane docked on the flight deck of a carrier is capable of receiving all network services for such area has been determined to be a zone of no or low threat. As the fighter plane departs from a low threat area such as zone A and moves into a more hostile zone such as Zone B, the network services become further restricted by the firewall. In such example, the network services to the destination system may be progressively restricted until only information specific to the mission in that specific zone or location is allowed to proceed through the firewall. Such configuration reduces vulnerabilities or threats to the destination system or network.

It is contemplated that additional security mechanisms such as an intrusion detection system may be used in combination with the situation aware firewall. For example, the intrusion detection system may be communicatively coupled to the destination system or firewall to detect and report intrusions into the system which were not effectively blocked by the firewall. Thus, the techniques of the intrusion detection system may be scaled according to the services enabled or disabled by the firewall.

Figure 5:
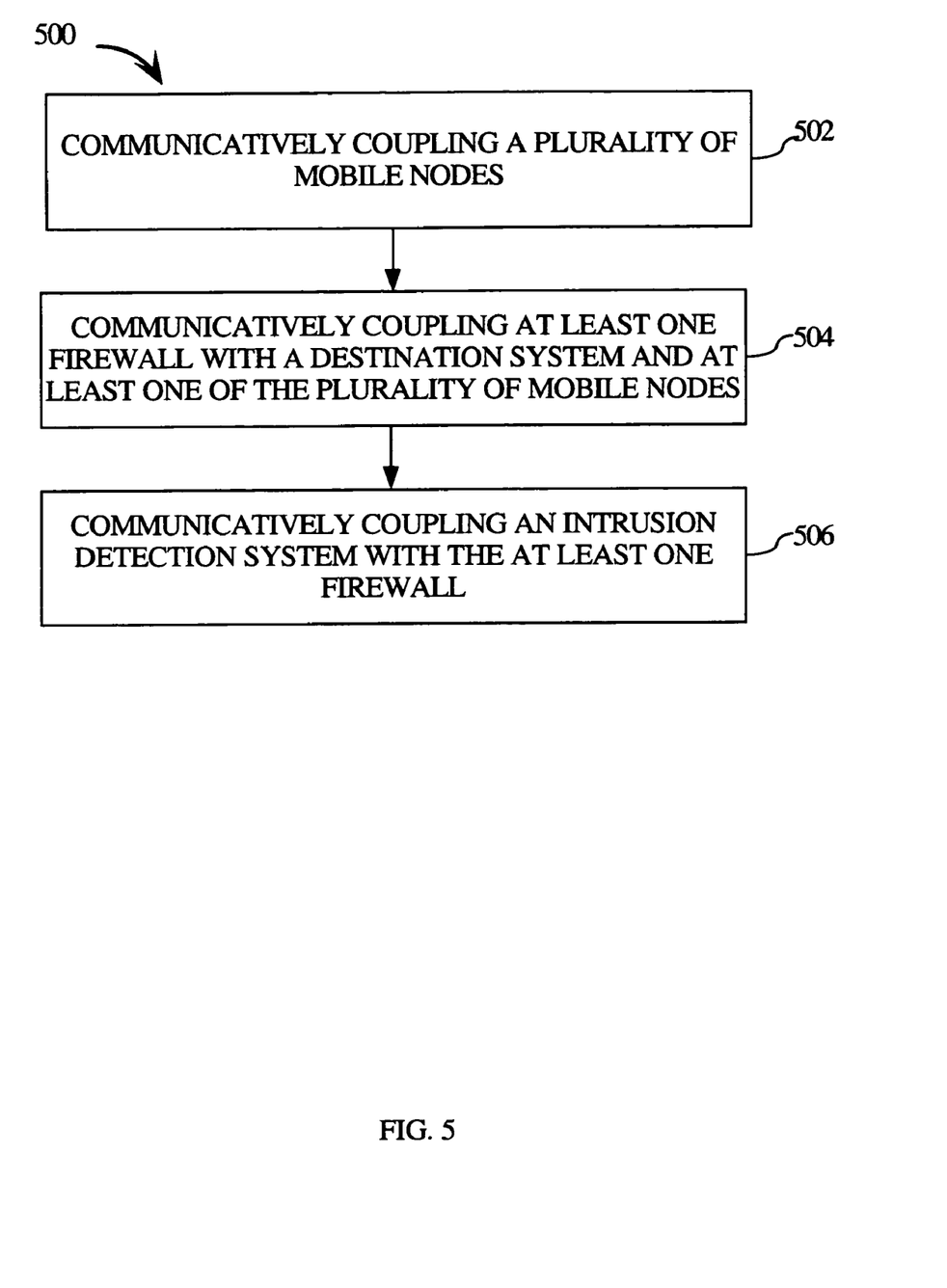
FIG. 5 is a flow diagram of a method for establishing a wireless network in accordance with an exemplary embodiment of the present invention, wherein a firewall employs geographical location as a controlling parameter for regulating data packet exchange between a source network and a destination system.
Figure 6:
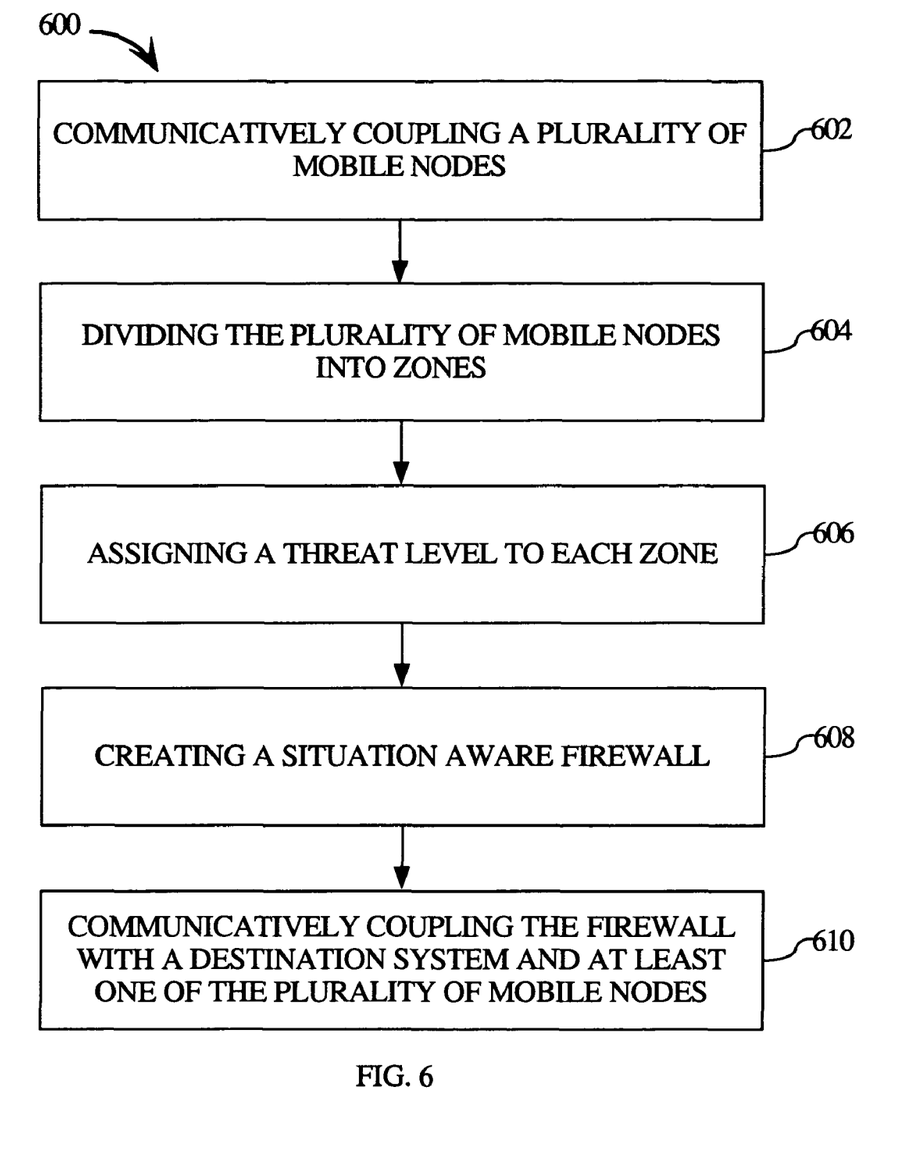
FIG. 6 is a flow diagram of an additional method for establishing a wireless network in accordance with an exemplary embodiment of the present invention, wherein a plurality of mobile nodes are communicatively coupled and divided into zones, a threat level being assigned to each zone.

In accordance with additional exemplary embodiments of the present invention, methods for establishing a wireless network system are provided in FIGS. 5 and 6 in which a firewall employs geographical location as a controlling parameter for regulating data packet exchange between a source network and a destination system. As illustrated in FIG. 5, a method 500 includes communicatively coupling a plurality of mobile nodes with each other for allowing data packets to be transferred between the source network and the destination system 502. In an embodiment, an ad hoc mobile network is created which allows the destination system to receive network services. In the embodiment, each individual mobile node may include a transmitter and a receiver for allowing data packets to be received and a response to be transmitted from the node. In addition, each individual node may include a positioning system such as a geographical positioning system which provides geographical co-ordinates to each node. In turn, each node may communicate their current geographic location to their neighboring nodes.

The method 500 also includes communicatively coupling at least one firewall with the destination system and at least one of the plurality of nodes for monitoring data packet exchange between the source network and the destination system 504. The at least one firewall utilizes at least location as a controlling parameter for regulating data packet exchange as the destination system moves into areas of with varying degrees of threat. As previously described, the plurality of mobile nodes may be divided into various zones according to such parameters as the possibility of encountering a cyber attack while being located within such zone. Further, the firewall may be created to include security protocols which control data packet traffic based upon the zone from which the packet originated. For example, data packets including information "X" may be allowed to pass through the firewall and be received by the destination system while the destination system is positioned in a zero to low threat zone, but not when such system is in a high threat zone.

In additional embodiments, the method 500 includes communicatively coupling an intrusion detection system with the at least one firewall or the destination system 506. The combination of the situation aware firewall and the intrusion detection system allows data packet traffic to be regulated at two levels. First, the firewall is configured to be preventive whereby the firewall is constructed to prevent unauthorized data packets from entering the destination system or network. Second, the intrusion detection system is designed to be reactive in which it reacts to an intrusion by an unauthorized data packet and reports such activity promptly to an administrator or other desired entity to minimize damage to the network or destination system.

Referring now to FIG. 6, a further embodiment of a method for establishing a wireless network which includes a situation aware firewall is disclosed. In the present method 600, a plurality of mobile nodes are communicatively coupled 602 with each other for allowing data packets to be transferred between a source network and a destination system 602. It is contemplated that each mobile node may be capable of receiving data packets and generating a response to such receipt. Further, each node may include the capability of detecting and broadcasting their geographical position to neighboring nodes as well as to desired systems. The plurality of mobile nodes are divided into zones 604 each zone being assigned a specific threat level 606. For example, nodes located in zone 1 may be assigned a threat level of zero, nodes in zone 2 a threat level of moderate, and nodes in zone 3 a threat level of severe.

In further embodiments, method 600 includes creating a situation aware firewall 608 and communicatively coupling such firewall to the destination system and at least one of the plurality of mobile nodes 610. As previously described, the firewall utilizes geographical location as one of the controlling parameters for regulating data packet exchange between the source network and the destination system. The firewall may include security protocols and parameters which allow the firewall to recognize data packets geographical location and filter such packets accordingly. For example, the firewall may allow all data packets sent from zone 1 to pass through while severely restricting those sent from zone 3. It is contemplated that the method 600 may further include the communicatively coupling an intrusion detection system with at least one of the destination system, the firewall or one of the plurality of mobile nodes.

In additional exemplary embodiments, a method of enhancing current network firewall functionality is provided in which the firewall includes location information to enable or disable services, functionality, communication links, and the like for mobile ad hoc nodes based on firewall service zones. For example, in addition to filtering data packet exchanges, the firewall may also disable services possibly at the physical (device interface) as well as the application service interface in high threat zones. In such example, applications may be restricted from executing or if detected, the firewall may terminate or halt application services.

It is to be noted that the foregoing described embodiments according to the present invention may be conveniently implemented using conventional general purpose digital computers programmed according to the teachings of the present specification, as may be apparent to those skilled in the computer art. Appropriate software coding may readily be prepared by skilled programmers based on the teachings of the present disclosure, as may be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A wireless communication system, comprising:
   a destination system and a source network, the source network providing network services to the destination system;
   a plurality of mobile nodes communicatively coupled with each other for allowing data packets to be transferred between the source network and the destination system, each mobile node included within the plurality of mobile nodes includes a positioning system allowing each node to detect their geographical location, each mobile node included within the plurality of mobile nodes is configured to periodically broadcast its geographical location; and
   at least one firewall coupled with the destination system, the at least one firewall being communicatively coupled with at least one of the mobile nodes included within the plurality of mobile nodes for monitoring data packet exchange between the source network and the destination system,
   wherein the at least one firewall utilizes the broadcast geographical locations of the mobile nodes and a geographical location of the destination system as controlling parameters for regulating data packet exchange as the destination system travels through zones associated with varying degrees of threat, the at least one firewall monitors each received data packet from said plurality of mobile nodes whereby each data packet includes a code which indicates a geographical location from which each data packet is originated, the geographical location from which each data packet is originated being associated with the at least one node included in the plurality of mobile nodes from which the firewall receives said data packet.

2. The wireless communication system as claimed in claim 1, wherein the positioning system is a global positioning system.

3. The wireless communication system as claimed in claim 1, wherein the source network is the Internet.

4. The wireless communication system as claimed in claim 1, wherein the destination system is disposed within at least one of a vehicle, aircraft, or watercraft.

5. The wireless communication system as claimed in claim 1, further comprising an intrusion detection system coupled to the at least one firewall for detecting intrusion.

6. The wireless communication system as claimed in claim 1, wherein each of the plurality of nodes includes a receiver and a transmitter.

7. A method for establishing a wireless network which utilizes a firewall that at least employs geographical location as a controlling parameter for regulating data packet exchange between a source network and a destination system, comprising:
   communicatively coupling a plurality of mobile nodes with each other for allowing data packets to be transferred between the source network and the destination system; and
   coupling at least one firewall with the destination system and communicatively coupling the at least one firewall with at least one of the mobile nodes included within the plurality of mobile nodes for monitoring data packet exchange between the source network and the destination system, the at least one firewall utilizing a geographical location of the destination system and a geographical location of the at least one mobile node as controlling parameters for regulating data packet exchange as the destination system travels through areas associated with varying degrees of threat, the at least one firewall monitors each received data packet from said plurality of nodes whereby each data packet includes a code which indicates a geographical location from which each data packet is originated, the geographical location from which each data packet is originated being associated with the at least one node included in the plurality of mobile nodes from which the firewall receives said data packet.

8. The method as claimed in claim 7, wherein each mobile node included within the plurality of mobile nodes includes a positioning system for allowing each mobile node to detect their geographical location, and each mobile node included within the plurality of mobile nodes is configured to periodically broadcast its geographical location.

9. The method as claimed in claim 7, wherein the method further comprises communicatively coupling an intrusion detection system coupled to the at least one firewall for detecting intrusion.

10. The method as claimed in claim 7, wherein the source network is the Internet.

11. The method as claimed in claim 7, wherein the destination system is disposed within at least one of a vehicle, aircraft, or watercraft.

12. The method as claimed in claim 7, wherein each of the plurality of nodes includes a receiver and a transmitter.

* * * * *